(No Model.)

G. S. LONG.
DRILL CHUCK.

No. 553,531. Patented Jan. 28, 1896.

Witnesses:
John Darby.
Henry A. Wolcott.

Inventor,
George S. Long
By Willard Eddy,
Atty.

UNITED STATES PATENT OFFICE.

GEORGE S. LONG, OF HARTFORD, CONNECTICUT, ASSIGNOR TO THE PRATT & LONG CHUCK COMPANY, OF SAME PLACE.

DRILL-CHUCK.

SPECIFICATION forming part of Letters Patent No. 553,531, dated January 28, 1896.

Application filed February 18, 1895. Serial No. 538,809. (No model.)

*To all whom it may concern:*

Be it known that I, GEORGE S. LONG, of the city and county of Hartford, Connecticut, have invented certain new and useful Improvements in Drill-Chucks, which improvements are described in the following specification and are illustrated by the accompanying drawings.

My invention relates in general to that class of expansion drill-chucks which are characterized by a channeled stock, convergent jaws, a conical cap, and a nut by means of which the jaws are moved, and in particular to the form and operation of such nut, and of intermediate mechanism by which the nut engages the jaws.

It is the object of this invention to increase the efficiency and durability of drill-chucks of the specified class by ample engagement between the jaws and the drill, and by diminished friction between the jaws and the mechanism by which they are moved and between the parts of that mechanism. To accomplish these objects I use jaws of a peculiar form and a non-rotatable and peripherally-threaded-ring, which surrounds the body of the chuck and has a sliding engagement with such jaws, in combination with a cylindrical nut, which works upon such threaded ring and slides the same forward and backward.

The best manner in which I have contemplated applying the principles of my invention is illustrated by said drawings, in which—

Figure 1:
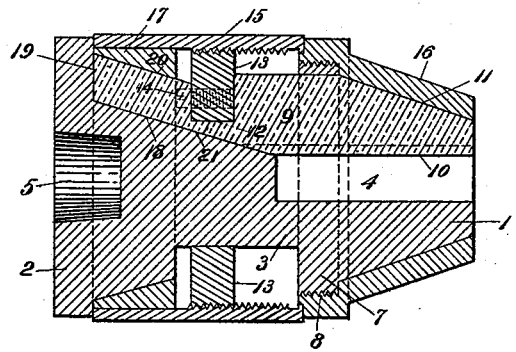
Figure 2:
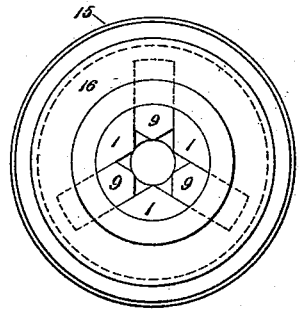
Figure 3:
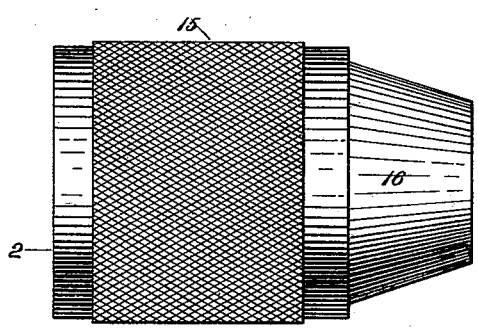
Figure 6:
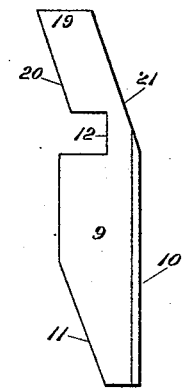
Figures 4, 5:
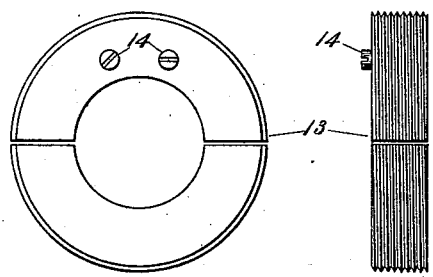

Figure 1 is an axial section of a drill-chuck which is constructed in accordance with those principles. Fig. 2 is a front elevation of the same. Fig. 3 is a side elevation of the same. In these three figures the jaws of the chuck are wide open and retracted. Figs. 4, 5, and 6 are details.

The stock or body of the chuck, as shown in Fig. 1, may be regarded as a solid of revolution. The anterior portion of the same (denoted by the numeral 1) is a truncated cone and has a cylindrical base 7, which is provided with an external screw-thread 8. The back portion of the stock, (denoted by the numeral 2,) being partly cylindrical and partly conical, is encircled by a cylindrical ring 17, and the intermediate neck (denoted by numeral 3) is also cylindrical. The forward part of the stock, including cone 1 and a part of neck 3, has a bore 4 for the reception of the drill. The back part of the same has, in like manner, a hole 5 to receive the mandrel of the drilling-machine. In this stock are formed convergent channels 18, which in this instance are three in number, for the accommodation of the jaws 9. These channels, being of uniform width, trisect the cone 1 in the usual manner, extend through the outer surface and entire length of neck 3, and terminate in the back part 2 of the stock, where they are covered by ring 17. Ring 17 is here regarded as a fixed part of the stock and may be formed integrally therewith. One of the channels fully occupied by jaw 9 is shown in Fig. 1. An end view of the same channels with jaws 9 therein is included in Fig. 2. These jaws are similar and interchangeable. Fig. 6 is a side elevation of one of them. Such jaw is of uniform thickness, excepting where thinned or sharpened along the gripping edge 10. Opposite the gripping edge 10 is an inclined edge 11, which is constantly in contact with the inner surface of the conical cap 16, which is hereinafter described. In the outer part of jaw 9 is cut a square notch 12, and back of this notch is a shank 19, of uniform rectangular cross-section. This shank is narrower than the forward part of jaw 9 and has its opposite edges 20 and 21 parallel to said inclined edge 11.

The above-mentioned non-rotatable and peripherally-threaded ring is denoted by the numeral 13 and is shown separately in Figs. 4 and 5, which are side and edge views of the same, respectively. This ring, being made of two sections, as shown, is placed around neck 3 and partly within notches 12, in the position which is indicated in Fig. 1, and is rendered non-rotatable by two stops 14, which project from the side of ring 13 upon opposite sides of either jaw. The stationary cylindrical nut 15 fits rotatably about the parts 7 and 17 of the stock and has a continual engagement with ring 13, as shown in Fig. 1. The numeral 16 denotes a conical cap fitting cone 1 and having a cylindrical screw-threaded base engaging the threads 8 about the base 7 of that cone.

The tool is assembled by first placing jaws 9 in their respective convergent channels of the stock; by then placing ring 13 in a position about the neck 3 and in the several notches 12, the stops 14 being on opposite sides of either one of the jaws 9; by then screwing nut 15 onto ring 13, and by then screwing on cap 16 in the position shown.

Such being the construction of my improved drill-chuck, its mode of operation is sufficiently obvious. The jaws being opened and closed by sliding backward and forward in the usual manner are moved in either direction, as may be desired, by means of ring 13, which moves with them and slides backward and forward upon neck 3 as nut 15 is rotated by hand. In the closing of the chuck, as the jaws 9 move forward from the retracted position which they occupy in Figs. 1 and 2 the driving-ring 13, as it slides along neck 3, rises from the bottom of notch 12 in each jaw 9, and in the opening of the chuck sinks again to the position shown, and in general occupies a greater or less portion of each notch 12, according as the jaws are more or less retracted. This chuck grips the drill with unusual firmness because of the extraordinary length of the gripping edges 10 of jaws 9 and works with little friction, because all tapering engagement by screw-threads is avoided.

The identity of this invention is not dependent upon the number of jaws which are driven by ring 13, for that number may be increased or diminished at pleasure, nor upon the proportions of the cylindrical ring 13, for that ring, so long as it remains cylindrical, may be varied in thickness or other particulars to any desired extent, nor upon the form or location of the stops by which the cylindrical ring is rendered non-rotatable, nor upon the precise method by which a sliding engagement is preserved between the reciprocating ring 13 and the convergent jaws 9.

I claim as my invention—

In a drill chuck, a stock, having a number of convergent channels, a conical cap, covering the forward part of said channels, and an equal number of sliding jaws, which are held in said channels, each of said jaws being provided with a gripping edge, to engage the drill, an inclined edge, to slide along the interior surface of the cap, and with a shank which has two sliding edges parallel to said inclined edge, in combination with driving mechanism, which engages said jaws, substantially as and for the purpose specified.

In testimony whereof I hereunto set my name in the presence of two witnesses.

GEORGE S. LONG.

Witnesses:
HENRY J. GILLETTE,
WILLARD EDDY.